United States Patent Office 2,754,182
Patented July 10, 1956

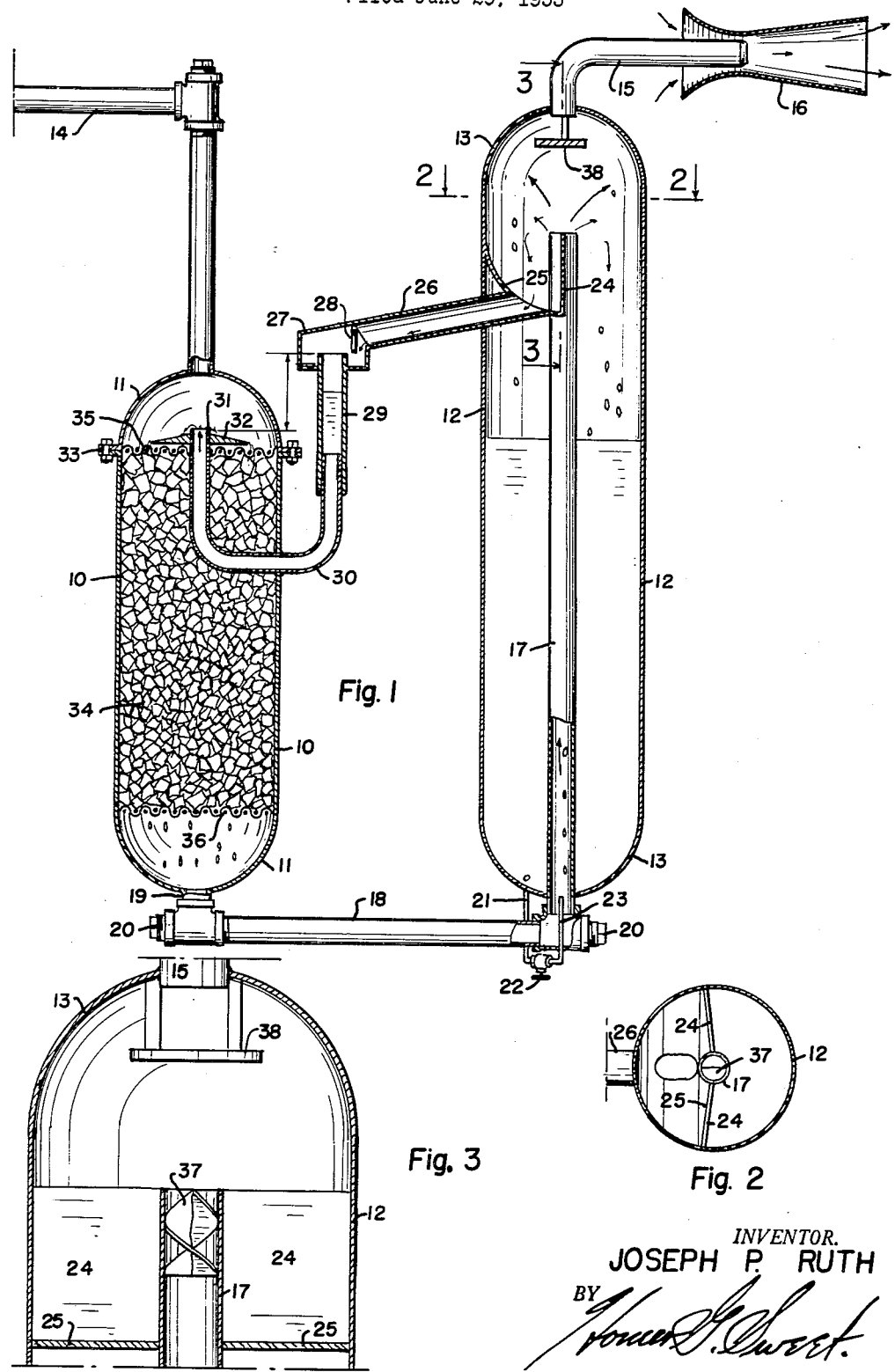

2,754,182

EXHAUST GAS CONDITIONER

Joseph P. Ruth, Denver, Colo.

Application June 29, 1953, Serial No. 364,634

9 Claims. (Cl. 23—284)

In an organization appropriate for practice of the method taught by my United States Patent No. 2,611,680, dated September 23, 1952, this invention relates to novel and improved apparatus for the treatment of internal combustion engine gases to mitigate and substantially nullify the irritant and noxious properties thereof, and has as an object to provide a practical exhaust gas conditioner unit particularly suited for mounting upon and to treat the engine exhausts of automotive vehicles.

A further object of the invention is to provide an exhaust gas conditioner that is structurally simple, compact, and adaptable to use in a variety of particular mountings.

A further object of the invention is to provide an exhaust gas conditioner continuously and efficiently operable in direct reaction to the pressures of the gases infed thereto.

A further object of the invention is to provide an exhaust gas conditioner productive of but nominal and acceptable resistance to exhaust gas outflow from the engine.

A further object of the invention is to provide an exhaust gas conditioner automatically responsive in operation to volume and pressure variations of the gas infed thereto.

A further object of the invention is to provide an exhaust gas conditioner that requires a minimum of servicing and maintenance throughout long periods of continuous use.

A further object of the invention is to provide an exhaust gas conditioner operable to modify and suppress the objectional and inimical properties of engine gases passed therethrough to such degree as accommodates discharge of the treated gas to the atmosphere of confined and restricted spaces without consequent human discomfort or hazard.

With the foregoing and other objects in view, my invention consists in the construction, arrangement, and operative combination of elements as hereinafter set forth, pointed out in my claims, and illustrated by the accompanying drawing, in which—

Figure 1 is an elevation, partly in vertical section, of a typical embodiment of the invention as constructed and assembled for practical use.

Figure 2 is a fragmentary, detail section taken substantially on the indicated line 2—2 of Figure 1.

Figure 3 is a fragmentary, detail section, on a relatively enlarged scale, taken substantially on the indicated line 3—3 of Figure 1.

It is well known that the exhaust gas output of internal combustion engines, and especially that of diesel-type engines, is characterized by properties disagreeable, irritating, and perilous to humans to an extent disqualifying such engines for use where their discharge unduly pollutes atmosphere utilized by humans. The expanding use of automotive equipment, extensively diesel powered, in congested areas fosters an urban problem for which correction is recognized to be necessary. As is fully disclosed in the patent above noted, internal combustion engine exhaust gases, including those from diesel-type units, may be expediently conditioned to suppress their noxious and objectionable properties prior to release of the gas to atmosphere by passing the gases under the influence of their discharge pressures through water to dissolve the soluble gas constituents and to form a gas-liquid mixture, washing the gas-liquid mixture through an intersticed alkaline diffusing medium substantially insoluble in water and soluble in the characteristic acidity of the mixture, whereby to neutralize the gas acidity, entrapping the resulting condensate, and liberating the undissolved gases. The desideratum being the melioration of automotive vehicle exhaust gases and a method being known and available for such purpose, the instant invention is directed to the provision of novel and improved means susceptible of convenient and practical association with such vehicles to accommodate efficient practice of such method.

As shown by the drawing, a closed, cylindrical, axially-elongated receiver 10 is suitably formed as a hollow shell terminating in domed end closures 11 and is arranged for mounted support with its axis substantially vertical in spaced parallelism with a reservoir 12 of similar construction and relatively greater length preferably characterized by domed end closures 13 and disposed with its lower end substantially coplanar with the lower end of the receiver 10. The usual line 14 for the direction and delivery of exhaust gas flow from an internal combustion engine, not shown, is connected through appropriate fittings to and centrally of the upper end closure 11 of the receiver 10 to discharge downwardly and axially within the latter, and a vent line 15 for the release of conditioned gases to atmosphere is connected centrally to and communicates through the upper end closure 13 of the reservoir 12 to disposition of its output end at the throat of a Venturi tube 16 effective to enhance atmospheric diffusion and dispersion of gas outflow from said line 15 in a well known manner.

A straight, tubular conduit 17 axially of and within the reservoir 12 upstands through the major length of the latter to terminate in an open upper end spacedly below the intake end of the line 15 and well above the upper end of the receiver 10, and the lower end of said conduit is sealed to and extends centrally through the reservoir lower end closure 13 to connection with a lateral flow line 18 leading from a flow connection, as by means of a nipple 19, with the lower end of the receiver 10; said line 18 being arranged, as by means of end plugs 20, for convenient drainage and cleaning. A by-pass line 21 furnished with a flow control valve 22 opens at one end to the interior of the reservoir lower end closure 13 exteriorly of the conduit 17 and line 18 and has its other end sealed through the latter to upstand as a jet 23 axially of and within the lower end of said conduit, whereby to provide for regulable supply of liquid charge from the reservoir to said conduit, as will hereinafter appear.

Sealed at their inner edges to walls of the conduit 17 with their upper margins coplanar with the open conduit upper end, like partition webs 24 extend oppositely, and approximately diametrically of the reservoir 12, to sealed engagement with and against the reservoir walls. In a uniformity of depth appropriate to space their lower margins well above the upper end of the receiver 10, the webs 24 close at their said lower margins against and are sealed to the inner edge of a baffle 25 bridging the half of the reservoir adjacent the receiver 10 and curving upwardly away from the conduit 17 and webs 24 to marginally sealed engagement with the reservoir wall, thus to define a trap at the upper end of the conduit occupying about one-half of the reservoir transverse area. Sealed at one end to and opening through the baffle 25 adjacent the conduit 17, a flow channel 26 inclines outwardly and downwardly of the reservoir 12 through a wall of the latter and toward the receiver 10 to a delivery connection with a closed trap 27 disposed above the receiver upper end, a check valve 28, conveniently of flap type, marking the junction of the channel 26 with the trap 27 in an arrangement permitting free flow from the channel to the trap and inhibiting flow in the opposite direction. Depending through the floor of the trap 27 with its open upper end preferably elevated within and above the floor of the trap, a column 29 connects at its lower end with the upwardly-directed outer arm of a U-shaped channel 30 sealed through a wall of the receiver 10 to dispose its inner arm, indicated at 31, axially of the receiver upper portion with its open end spaced below and directed upwardly toward the input end of the exhaust gas line 14 delivering to said receiver; an annular distributing flange 32 being fixed to and outstanding radially about the open upper end of said arm 31 to spread and divert outflow from said arm toward the walls of the receiver 10.

To facilitate charging and servicing of the receiver 10, the domed upper end closure 11 thereof is detachable, as at a flanged joint 33, and the main cylindrical body of said receiver below said joint is filled with an intersticed charge 34 of suitable alkaline material, such as broken lime rock, retained between upper and lower foraminous webs, 35 and 36, respectively, transversely bridging the receiver interior at about the zones of domed end closure 11 mergence with the cylindrical main body portion, the upper web 35 surrounding the channel arm 31 below the flange 32 at approximately the level of the joint 33. Completing the structural organization of the apparatus, a short spiral vane 37 is fixed in and to impose a swirling effect on the outward flow through the upper end of the conduit 17 and a baffle 38 is hung in the upper end closure 13 of the reservoir 12 between the opposed ends of the conduit 17 and vent line 15.

Constructed and assembled as shown and described in a suitable proportioning of column 29 extension above the level of the arm 31 outlet to the operating pressures developed within the receiver 10, the reservoir 12 is charged with water to a level about the same as that of the arm 31 outlet, the valve 22 being closed, and the apparatus is then ready for its intended use.

With the water charge restricted to the reservoir 12 and the valve 22 closed, inflow of exhaust gas through the line 14 to the receiver 10 is substantially unaltered as it passes through the charge 34, line 18, conduit 17, and vent line 15 to atmosphere, it being necessary that a mixture of the gas with water be had and that such mixture be washed through the charge 34 before effective conditioning of the gas may result. In an initial condition prior to input of exhaust gas to the receiver 10, opening of the valve 22 permits water from the reservoir charge to enter the conduit 17 and line 18 through the by-pass 21 and to rise from said line within the receiver until a common water level obtains in both reservoir and receiver. In such a situation, input of exhaust gas to the receiver 10 through the line 14 acts to build up pressure within said receiver, escape of the gas through the channel 30—31, column 29, trap 27, and flow channel 26 being blocked by the check valve 28, until such pressure is sufficient to evacuate the water from the receiver through the line 18 and conduit 17 and to percolate the gas upwardly through said conduit and the water therein. As water is thus ejected from the upper end of the conduit 17 with a swirling motion deriving from the vane 37, and as deflected by the baffle 38, a portion of the water discharge is received and collects in the trap formed by the partition webs 24 and curved baffle 25 and flows thence through the channel 26 to the trap 27 and column 29, ultimately filling the latter and the U-shaped channel 30—31. Given an appropriate height of column 29 filled with water, the resulting head of water therein balances and overcomes the pressure developed within the receiver 10 to establish an outflow of water from the end of the arm 31 and across the flange 32 in the path of the incoming gas, so that, as the gas and water infeeds combine and traverse the charge 34, the effective gas and water mixture is established and washed over the neutralizing surfaces of the charge. Once the column 29, trap 27, and channel 30—31 are water-charged, continuous operation of the conditioner is automatic in reaction to exhaust gas infeed to the receiver and the valve 22 may be adjusted to supply from the reservoir only that amount of water needed to replenish that of the circulating system. Thus the gas incoming to the receiver is constantly wetted and mixed with water for effective reaction with the material of the charge 34, the pressure within the receiver is balanced by the head of the column 29 to permit infeed of water in the path of the incoming gas, solids and condensates are segregated in the system apart from the cleansed gases, and the latter separate from the entrained water in the upper end of the reservoir 12 whence they pass through the vent line 15 to atmosphere as dispersed and attenuated by the Venturi tube 16; the so-treated gases being wholly innocuous and unobjectionable.

Manifestly, with gas incoming to the receiver before the circulating system is charged with water, opening of the valve 22 for supply of water to the gas stream uprising within the conduit 17 operates to charge the trap 27, column 29, channel 30—31 in the same manner and to the same effect above set forth.

Fluctuations of exhaust gas flow and of pressures manifest in the receiver 10 are immediately and directly reflected by the head established in and the water flow through the circulating system, thereby automatically adjusting the action and capacity of the system to effectively treat the gas input, all as is clearly apparent.

Since changes, variations, and modifications in the particular form, construction, proportions, and arrangement of the elements shown and described may be had without departing from the spirit of my invention, I wish to be understood as being limited solely by the scope of the appended claims, rather than by any details of the illustrative showing and foregoing description.

I claim as my invention:

1. An exhaust gas conditioner comprising, a receiver adapted to house an intersticed charge of alkaline material, a reservoir adapted to confine a water charge at one side of, adjacently paralleling, and with its lower end in the same horizontal plane with the lower end of said receiver, a gas infeed to the upper end of said receiver, a gas vent to atmosphere from the upper end of said reservoir, a gas flow line connecting the lower end of the receiver with the interior of the reservoir, and means engaging between said receiver and reservoir operable to continuously supply water from the reservoir to the path of the gas incoming to the receiver in reaction to flow of gas through the apparatus from said infeed and to said vent.

2. An exhaust gas conditioner comprising, a receiver adapted to house an intersticed charge of alkaline material, a reservoir adapted to confine a water charge at one side of, adjacently paralleling, and with its lower end in the same horizontal plane with the lower end of said receiver, a gas infeed to the upper end of said reservoir, a conduit sealed through the lower end and opening to the upper interior of said reservoir, a gas flow line connecting the lower end of the receiver with the conduit end exterior to the reservoir, means for the regulable infeed of water from the reservoir to the lower end of said conduit, and means engaging between said receiver and a zone of said reservoir adjacent the outlet end of said conduit operable to continuously supply water from the reservoir to the path of the gas incoming to the receiver in reaction to flow of gas through the apparatus from said gas infeed and to said vent.

3. An exhaust gas conditioner comprising, a vertically-elongated receiver adapted to house an intersticed charge of alkaline material, a vertically-elongated reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of said reservoir, a conduit sealed through the lower end and opening to the upper interior of said reservoir, a gas flow line connecting the lower end of the receiver with the conduit end exterior to the reservoir, means for the regulable infeed of water from the reservoir to the lower end of said conduit, a trap partially obstructing the reservoir interior subjacent the conduit upper end for collection of a portion of the water output from the conduit, a closed channel inclined for gravity flow of water from said trap to delivery within said receiver in spaced opposition to the gas infeed thereto, and a check valve in said closed channel inhibitive of reverse flow therethrough.

4. An exhaust gas conditioner comprising, a vertically-elongated receiver adapted to house an intersticed charge of alkaline material, a vertically-elongated reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of said reservoir, a conduit sealed through the lower end and opening to the upper interior of said reservoir, a gas flow line connecting the lower end of the receiver with the conduit end exterior to the reservoir, means for the regulable infeed of water from the reservoir to the lower end of the conduit, a trap partially obstructing the reservoir interior subjacent the conduit upper end for collection of a portion of the water output from the conduit, a closed channel inclined for gravity flow of water from said trap to delivery within the receiver in spaced opposition to the gas infeed thereto, the inlet of said closed channel being elevated above the channel outlet to establish a head in the water-filled channel proportioned to balance pressures obtaining within the receiver, and a check valve in said closed channel inhibitive of reverse flow therethrough.

5. An exhaust gas conditioner comprising, a vertically-elongated receiver adapted to house an intersticed charge of alkaline material, a vertically-elongated reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of said reservoir, a conduit sealed through the lower end and opening to the upper interior of said reservoir, a gas flow line connecting the lower end of the receiver with the conduit end exterior to the reservoir, a valved by-pass line connecting between the lower end of the reservoir and the interior of the conduit lower end for the regulable infeed of water to said conduit, a trap partially obstructing the reservoir interior subjacent the conduit upper end for collection of a portion of the water output from the conduit, a closed channel inclined for gravity flow of water from said trap to delivery within the receiver in spaced opposition to the gas infeed thereto, the inlet of said closed channel being elevated above the channel outlet to establish a head in the water-filled channel proportioned to balance pressures obtaining within the receiver, and a check valve in said closed channel inhibitive of reverse flow therethrough.

6. An exhaust gas conditioner comprising, a vertically-elongated receiver, foraminous webs bridging upper and lower portions of said receiver adapted to retain an intersticed charge of alkaline material filling the receiver therebetween, a vertically-elongated reservoir adapted to confine a water charge adjacently paralleling said receiver in a height greater than that of the latter, said receiver and reservoir being positioned with their lower ends in the same horizontal plane, a gas infeed to the upper end of said receiver above the upper of the webs therein, a gas vent to atmosphere from the upper end of said reservoir, a conduit sealed through the lower end and opening to the upper interior of said reservoir, a gas flow line connecting the lower end of the receiver below the lower of the webs therein with the conduit end exterior to the reservoir, a valved by-pass line connecting between the lower end of the reservoir and the interior of the conduit lower end for the regulable infeed of water to said conduit, a trap partially obstructing the reservoir interior subjacent the conduit upper end for collection of a portion of the water output from the conduit, a closed channel inclined for gravity flow of water from said trap to delivery within the receiver in spaced opposition to the gas infeed thereto and above the upper of the webs therein, means for spreading the outflow from said closed channel laterally of the adjacent web and the charge of material thereunder, an elevation of the closed channel inlet above its outlet productive of a head in the water-filled channel proportioned to balance pressures obtaining within the receiver, and a check valve in said closed channel inhibitive of reverse flow therethrough.

7. In an exhaust gas conditioner having a receiver adapted to house an intersticed charge of alkaline material, a reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of said reservoir, a conduit sealed through the lower end and opening to the upper interior of said reservoir, and a gas flow line connecting the lower end of the receiver with the conduit end exterior to the reservoir, means operable to continuously supply water from the reservoir to the path of the gas incoming to the receiver in reaction to flow of gas through the apparatus from said infeed and to said vent, said means comprising a valved by-pass line connecting between the lower end of the reservoir and the interior of the conduit lower end for the regulable infeed of water to said conduit, a trap partially obstructing the reservoir interior subjacent the conduit upper end for collection of a portion of the water output from the conduit, a closed channel inclined for gravity flow of water from said trap to delivery within the receiver in spaced opposition to the gas infeed thereto, and a check valve in said closed channel inhibitive of reverse flow therethrough.

8. In an exhaust gas conditioner having a receiver adapted to house an intersticed charge of alkaline material, a reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of the reservoir, a conduit sealed through the lower end and opening to the upper interior of said reservoir, and a gas flow line connecting the lower end of the receiver with the conduit end exterior to the reservoir, means operable to continuously supply water from the reservoir to the path of the gas incoming to the receiver in reaction to flow of gas through the apparatus from said infeed and to said vent, said means comprising a valved by-pass line connecting between the lower end of the reservoir and the interior of the conduit, a trap partially obstructing the reservoir interior subjacent the conduit upper end for collection of a portion of the water output from the conduit, a closed channel inclined for gravity flow of water from said trap to delivery within the receiver in spaced opposition to the gas infeed thereto, the inlet of said closed channel being elevated above the channel outlet to establish a head in the water-filled channel proportioned to balance pressures obtaining within the receiver, and a check valve in said closed channel inhibitive of reverse flow therethrough.

9. In an exhaust gas conditioner having a receiver adapted to house an intersticed charge of alkaline material, a reservoir adapted to confine a water charge adjacently paralleling said receiver in a height greater than that of the latter, said receiver and reservoir being positioned with their lower ends in the same horizontal plane, a gas infeed to the upper end of said receiver, a gas vent to atmosphere from the upper end of the reservoir, a conduit sealed through the lower end and opening to the upper interior of the reservoir, and a gas flow line connecting the lower end of the receiver with the conduit end exterior to the reservoir, means operable to continuously supply water from the reservoir to the path of the gas incoming to the receiver in reaction to flow of gas through the apparatus from said infeed and to said vent, said means comprising a valved by-pass line connecting between the lower end of the reservoir and the interior of the conduit lower end for the regulable infeed of water to said conduit, partition webs bridging oppositely between the upper end portion of said conduit and the reservoir walls, a baffle closing between lower margins of said webs and the reservoir wall intercepted between the webs, whereby to define a trap partially obstructing the reservoir interior subjacent the conduit upper end for collection of a portion of the water output from the conduit, a closed channel inclined for the gravity flow of water from said baffle to delivery within the receiver, an upwardly-directed discharge end of said closed channel spacedly opposed to the gas infeed to the receiver, an altitudinal offset of the closed channel inlet above its said discharge end effective to establish a head in the water-filled channel proportioned to balance pressures obtaining within the receiver, a spiral vane in the outlet end of the conduit operable to swirl the conduit outflow, an annular flange about the closed channel discharge end for the distribution of outflow therefrom, and a check valve in the closed channel inhibitive of reverse flow therethrough.

References Cited in the file of this patent

UNITED STATES PATENTS 1,860,298    Stelzner _____ May 24, 1932